US008742016B2

(12) United States Patent
Besser et al.

(10) Patent No.: US 8,742,016 B2
(45) Date of Patent: Jun. 3, 2014

(54) METHOD FOR PRODUCING CARBOXYLATED ETHYLENE POLYMER BLENDS

(75) Inventors: Klaus Besser, Gutenberg (DE); Jochen Gerecke, Halle/Saale (DE); Lutz Haeussler, Halle/Saale (DE); Bianka Leitner, Schkopau (DE); Inno Rapthel, Halle/Saale (DE)

(73) Assignee: Dow Global Technologies LLC, Midland, MI (US)

( * ) Notice: Subject to any disclaimer, the term of this patent is extended or adjusted under 35 U.S.C. 154(b) by 297 days.

(21) Appl. No.: 12/677,344

(22) PCT Filed: Sep. 9, 2008

(86) PCT No.: PCT/DE2008/001506
§ 371 (c)(1),
(2), (4) Date: Dec. 2, 2010

(87) PCT Pub. No.: WO2009/033465
PCT Pub. Date: Mar. 19, 2009

(65) Prior Publication Data
US 2011/0077356 A1    Mar. 31, 2011

(30) Foreign Application Priority Data
Sep. 11, 2007   (DE) .......................... 10 2007 043 972

(51) Int. Cl.
| | | |
|---|---|---|
| C08F 2/36 | (2006.01) | |
| C08F 255/02 | (2006.01) | |
| C08L 23/26 | (2006.01) | |
| C08L 51/00 | (2006.01) | |
| C08F 255/04 | (2006.01) | |
| C08F 8/46 | (2006.01) | |
| C08J 3/20 | (2006.01) | |
| C08L 23/04 | (2006.01) | |
| C08L 23/14 | (2006.01) | |
| C08L 51/06 | (2006.01) | |
| C09J 151/06 | (2006.01) | |

(52) U.S. Cl.
USPC .................. 525/71; 525/78; 525/80; 525/84

(58) Field of Classification Search
USPC ......................................... 525/71, 78, 80, 84
See application file for complete search history.

(56) References Cited

U.S. PATENT DOCUMENTS

| | | |
|---|---|---|
| 4,174,358 A | 11/1979 | Epstein |
| 4,537,929 A | 8/1985 | Nangrani |
| 4,684,576 A | 8/1987 | Tabor et al. |
| 4,751,270 A | 6/1988 | Urawa et al. |
| 4,927,888 A | 5/1990 | Strait et al. |
| 5,346,963 A | 9/1994 | Hughes et al. |
| 5,476,905 A | 12/1995 | Schwager et al. |
| 5,643,997 A | 7/1997 | Matsuoka et al. |
| 5,969,050 A | 10/1999 | Vandevijver et al. |
| 6,331,592 B1 | 12/2001 | Wong |
| 6,384,139 B1 | 5/2002 | Ho et al. |
| 6,884,850 B2 | 4/2005 | Schauder et al. |

FOREIGN PATENT DOCUMENTS

| | | |
|---|---|---|
| DE | 4123972 A1 | 1/1993 |
| EP | 0266221 A2 | 5/1988 |
| EP | 0266994 A2 | 5/1988 |
| EP | 0287140 | 10/1990 |
| EP | 0403109 A2 | 12/1990 |
| EP | 0501762 A1 | 9/1992 |
| EP | 0519617 A1 | 12/1992 |
| EP | 0581360 A2 | 2/1994 |
| EP | 0647246 A1 | 4/1995 |
| EP | 0696303 A1 | 2/1996 |
| EP | 0754731 A2 | 1/1997 |
| EP | 0878510 A1 | 11/1998 |
| EP | 1298168 A1 | 4/2003 |
| WO | WO-9118053 A1 | 11/1991 |
| WO | WO-9301052 A1 | 1/1993 |
| WO | WO-9842760 A1 | 10/1998 |

OTHER PUBLICATIONS

Gerecke, STN Abstract No. AN 1993:581562 (Jan. 1993).*
International Search Report (PCT/DE2008/001506).

* cited by examiner

*Primary Examiner* — Jeffrey Mullis

(57) ABSTRACT

Procedure for the manufacture of carboxylated ethylene polymer blends, in which in a $1^{st}$ step, in a fluid mixing reactor, to 100 pbw of a particulate ethylene polymer—chosen from among ethylene homopolymers (HDPE, LDPE) and/or linear ethylene copolymers with 2 to ≤20 wt.-% polymerized-in $C_{3-12}$-olefin units (LLDPE, EOP), with a melt-flow rate MFR (190° C./2.16 kg)≥20 g/10 min—are added 0.05-15 pbw of a α,β-ethylenically unsaturated mono and/or dicarboxylic acid or its anhydride (carboxyl monomer), or a monomer mixture containing at least one carboxyl monomer and 0.01-10 pbw of a radical initiator or initiator mixture, and graft-polymerizing at reaction temperatures of 30-120° C., over a reaction time of 5-120 min and subsequently, in a $2^{nd}$ step, reacting a mixture continuously fed into a reaction extruder of 100 pbw of the modified ethylene polymer obtained in the $1^{st}$ solid phase step, 150-4,000 pbw of an ethylene polymer or polymer blend with a melt flow rate MFR (190° C., 2.16 kg)<20 g/10 min, as well as 0-4,000 pbw of an olefinic elastomer, at temperatures of 160-260° C. and continuously removing the graft-modified ethylene polymer blend that has a degree of carboxylation of 0.05-1 wt.-%. The products obtained are especially suitable as adhesion promoters and/or adhesives for numerous substrates, preferably on and between metallic surfaces.

8 Claims, No Drawings

METHOD FOR PRODUCING CARBOXYLATED ETHYLENE POLYMER BLENDS

The invention concerns a procedure for the manufacture of carboxylated ethylene polymer blends, composed of at least two different ethylene homo and/or copolymers, in two steps and their use as adhesion promoter in plastic-metal composites.

Numerous applications, in particular as compatibility or adhesion promoters (adhesives), involve the use of carboxylated olefin polymers based on polyethylenes of different densities (LDPE, MDPE, HDPE), ethylene/$\alpha,\beta$-ethylenically unsaturated $C_{3-12}$-olefin copolymers (LLDPE, POE), or also of propylene homo (HPP) as well as random and heterophasic propylene copolymers (RCP, HCP), ethylene/propylene copolymers (EPC) or ethylene/propylene/diene terpolymers (EPDM) that in general are manufactured using reactive extrusion at high temperatures (150-300° C.) by grafting a carboxyl group-containing monomer such as acrylic acid, fumaric acid and especially, maleic acid anhydride, onto the olefinic backbone-polymer in the presence of a radical-forming peroxidic initiator (WO 91/18053, U.S. Pat. No. 4,174, 358, U.S. Pat. No. 4,537,929, U.S. Pat. No. 4,684,576, U.S. Pat. No. 4,751,270, U.S. Pat. No. 4,927,888, EP 0266221 B1, EP 0287140 B1, EP 0403109 A2, EP 0467178 B1, EP 0581360 B1, EP 0696303 B1, EP 0878510 B1).

While graft carboxylation, preferably maleinization, performed in a solvent at low reaction temperatures, —i.e. below the melting point of the olefinic backbone polymer (graft substrate)—because of the technologically very costly polymer dissolution and especially, the solvent separation and recovery following the completed graft reaction, as well as the required graft product purification, is not an economic alternative to melt-grafting of acid (anhydride) monomers, the carboxylation of olefin polymers based on the solid-fluid particulate polymer phase carried out at below the melting or softening temperature of the graft substrate, is an economical technology (DD 275160 A3, DD 275161 A3, DD 300977 A7, DE 4123972 A1, DE 4342605 A1, EP 0469693 B1).

Backbone polymers especially suited for this are partially crystalline olefin polymers that allow fast diffusion rates for low-molecular compounds such as acid or anhydride monomers, in the amorphous phase forming between their glass and melting temperatures, one precondition for their high graft polymerization rates.

Under certain polymerization conditions it is also possible to use amorphous and low-crystalline olefin elastomers with special morphology as polymer backbone for the free-radical solid phase graft modification (EP 0642538 B1, EP 0805827 B1), without however achieving the properties required for use as highly effective adhesion promoter, in particular the demanding metal/plastic composites.

Among possible adhesion promoters are—besides carboxylated (maleinized) polyethylenes of high density (HDPE), or branched polyethylenes of low density (LDPE)—above all also carboxylated linear ethylene copolymers of low density, either with a low $C_{3-12}$-olefin comonomer fraction (below 15 wt.-%, LLDPE), or with a higher $C_{3-12}$-olefin comonomer fraction (above 15 wt.-%, POE), in particular ethylene/octene ($C_{8-}$) copolymers (EOC), as well as also random propylene/ethylene copolymers of predominantly propylene units consisting predominantly of propylene units that for their carboxylation can be manufactured exclusively via melt-grafting, preferably using MSA as graft agent (U.S. Pat. No. 5,346,963, U.S. Pat. No. 6,384,139 B1, U.S. Pat. No. 6,331,592 B1, U.S. Pat. No. 6,884,850 B1; DE 198 41 303 A1, WO 01/92357 A1, WO 98/42760 A1, EP 0659784 B1) and as adhesives for various applications (EP 0696303 B1, EP 0754731 B1, EP 0878510 B1).

For special application areas it is also possible to use melt-carboxylated (-maleinated) ethylene/vinyl acetate (EVA) or ethylene/(meth)acrylic acid copolymers (E(M)AE) (EP 0266994 A2, EP 0647246 B1, WO 93/01052 A1).

In addition, adhesive resin masses are know that use melt-graft-carboxylated mixtures of a crystalline polyolefin such as HDPE or LLDPE and an amorphous or little crystallized olefin copolymer, for instance ethylene/propylene rubber (EPM) (EP 0501762 B1).

The disadvantage of known melt-grafted ethylene homo and copolymers, as well as of graft-modified olefinic elastomers consists in their high molecular weights that accrue during the grafting reaction and that show in particular in their negative effects when used as adhesives, and the overall cost-intensive measures for the removal of residual monomers.

It was the task of the present invention—while avoiding the disadvantages described—to develop a procedure for the manufacture of an adhesion promoter (adhesive) based on the carboxylation of polyethylenes (HDPE, LDPE) and/or ethylene/$\alpha,\beta$-ethylenically unsaturated $C_{3-12}$-olefin copolymers (EPC, LLDPE, POE).

The object of the present invention is a procedure for the manufacture of carboxylated ethylene polymer blends in two steps, where in a $1^{st}$ step, in a fluid mixing reactor, to 100 parts by weight (pbw) of solid-fluid particulate ethylene polymer—with an MFR (190° C./2.16 kg load weight)$\geq$20 g/10 min, chosen from among ethylene homopolymers and/or linear ethylene copolymers of composition$\geq$80-98 wt.-% ethylene/2 to $\leq$20 wt.-% $C_{3-12}$-olefin units—are added 0.05-15 pbw of an $\alpha,\beta$-ethylenically unsaturated mono and or dicarboxylic acid or its anhydride (carboxyl monomer), or an at least one carboxyl monomer-containing monomer mixture and 0.01-10 pbw of a free radical-forming initiator with a 1 h half-time temperature ($T_{HW/1h}$) of 50-200° C., or adding a corresponding initiator mixture and graft-polymerizing at reaction temperatures of 30-120° C. for 5-120 min and subsequently, in a $2^{nd}$ step, continuously feeding into a reaction extruder 100 pbw of the modified ethylene polymer obtained in the $1^{st}$, solid phase step, together with 150-4,000 pbw of an unmodified ethylene polymer or polymer blend with a MFR (190° C./2.16 kg load weight) of <20 g/10 min, chosen from among ethylene homopolymers or ethylene copolymers of composition$\geq$85-98 wt.-% ethylene/2 to $\leq$15 wt.-% $C_{3-12}$-olefin units, or compounds or reactor blends consisting of LLDPE and HDPE, as well as 0-4,000 pbw of an olefinic elastomer of composition 10-100 wt.-% propylene and 0-90 wt.-% polymerized-in ethylene and/or $C_{4-12}$-olefin and/or diene units, or based on an ethylene copolymer with 10-80 wt.-% polymerized-in vinyl acetate or (meth)acrylic acid ester units, via gravimetric dosing devices and reacted at temperatures of 160-260° C., such that at the reactor end continuously removing a graft-modified olefin polymer blend with a carboxylation degree of 0.5-1 wt.-%.

While for the carboxylation process according to the invention in the $1^{st}$ step are chosen more easily flowing ethylene polymers of MFR (190° C., 2.16 load weight)$\geq$20 g/10 min, i.e. those of low molecular weight $M_w$ ($NM_w$), chosen from among linear polyethylenes of high density (HDPE-$NM_w$) or branched polyethylenes of low density (LDPE-$NM_w$), or linear ethylene copolymers with 2 to maximally 20 wt.-% $C_{3-12}$ olefin units (LLDPE-$NM_w$, EOP-$NM_w$), for the subsequent melt-graft step are used—together with the ethylene polymer modified in the solid state $1^{st}$ step—, an unmodified less flowing ethylene homo and/or copolymer with MFR (190°

C., 2.16 load weight)<20 g/10 min, i.e. an ethylene polymer of higher molecular weight $M_w$ ($HM_w$) corresponding to HDPE-$HM_w$, LDPE-$HM_w$, LLDPE-$HM_w$ or also an HDPE/LLDPE-blend-$HM_w$.

In addition, usually an olefinic elastomer is used, chosen from among elastomeric propylenes (ELPP) or random propylene copolymers with 5-50 wt.-% ethylene and/or $\alpha,\beta$-ethylenically unsaturated $C_{4-8}$-olefin and/or diene units, preferably 10-25 wt.-% ethylene units (PER), or ethylene copolymers with ≥20 wt.-% $\alpha,\beta$-ethylenically unsaturated $C_{3-12}$-olefin units (EOR), preferably propylene, butene, hexene or methylpentene or octene units, especially preferred with 25-50 wt.-% propylene (EPR*), 1-butene (EBR*) or 1-octene units (EOR*), or an ethylene/vinyl acetate (EVA) or an ethylene/(meth)acrylic acid ester copolymer (E(M)AE), preferably an ethylene copolymer with ≥15 wt.-% polymerized-in butyl acrylate units (EBA).

For some applications as adhesive—especially when adhesion strength>3 N/mm are not necessary—the addition of olefinic elastomers can be foregone (special implementation form based on 0 pbw elastomer).

In contrast to the known branched polyethylenes of low density of 0.910-0.940 g/cm³ (LDPE), manufactured at high pressure and high temperature using radical initiators, the linear polyethylenes of high density of 0.940-0.965 g/cm³ (HDPE) and linear ethylene/<15 wt.-% $C_{3-12}$-olefin copolymer of low density of <0.940 g/cm³ (LLDPE) are generally manufactured using the known technologies of coordinative catalysis, with catalysts of the Ziegler or Ziegler-Natta, or Phillips type.

On the other hand, the ethylene copolymers that can be used according to the invention, with a high $C_{3-12}$-olefin fraction of ≥15 wt.-% (EOP, EOR) and the olefin elastomers composed predominantly of propylene units, such as in particular PER, as well as elastomeric polypropylenes (ELPP), are as known manufactured using special metallocene catalyst systems.

The use of blends consisting of at least two different ethylene (co)polymers, in particular for the melt-graft step, in the form of compounds or also as reactor blends, is a suitable implementation form of the procedure according to the invention, according which in the $2^{nd}$ step a blend of 10-90 wt.-% LDPE or LLDPE and 90-10 wt.-% HDPE, preferably of 20-80 wt.-% LLDPE and 80-20 wt.-% HDPE, with an MFR (190° C., 2.16 kg)<20 g/10 min is used in the reactor, preferably a twin-screw kneading reactor (DSK).

The carboxyl monomer, preferably maleic acid anhydride (MSA) and/or acrylic acid (AS), can also be used mixed with a comonomer from the group of vinyl aromatics, preferably styrene, and/or the $C_{1-12}$-alkyl esters of acrylic or methacrylic acid, preferably methyl methacrylate (MMA), or methyl (MA) or ethyl (EA) or butyl acrylate (BA), corresponding to compositions of 99-20 wt.-% carboxyl and 1-80 wt.-% comonomer, preferably 90-50 wt.-% MSA and/or AS and 10-50 wt.-% styrene, can be used in the solid phase step.

The radical-initiated two-step grafting is y performed to achieve sufficiently high degrees of carboxylation as well as even grafting, advantageously using a radical-former or preferably, a mixture of at least two different radical-formers, using organic peroxides with half time temperatures after one hour, $T_{HW/1h}$ of 50-200° C., or after 1 min, $T_{HW/1min}$ of 85-250° C. (measured in 0.1 M monochloro-benzene solution), in a concentration relative to the entire ethylene polymer graft substrate amount, of 0.001-5 wt.-%, preferably of 0.02-2 wt.-%.

Selected examples of radical formers that can be used are dialkylperoxide-dicarbonates with a 1 h half time temperature ($T_{HW/1h}$) of 55-66° C., preferably dibutylperoxide-dicarbonate (DBPOC) and dicetylperoxide-dicarbonate (DCPOC) with $T_{HW/1h}$ of 65° C., dilaurylperoxide (DLPO) with $T_{HW/1h}$ of 80° C., di-benzoylperoxide (DBPO) with $T_{HW/1h}$ of 91° C., tert.-butylperoxy-2-ethyl hexanoate (TBPEH) with $T_{HW/1h}$ of 91° C., tert.-butylperoxy isobutyrate (TBPIB) with $T_{HW/1h}$ of 98° C., 1,1-di-(tert.-butylperoxy)-cyclohexane (DTBPC) with $T_{HW/1h}$ of 113° C., tert.-butyl perbenzoate (TBPB) with $T_{HW/1h}$ of 122° C., dicumyl peroxide (DCP) with $T_{HW/1h}$ of 132° C., 2,5-dimethyl-2,5-di-(tert.-butylperoxy)-3-hexine (DHBP) with $T_{HW/1h}$ of 134° C., 2,5-dimethyl-2,5-di(butylperoxy)-(3)hexine (DYBP) with $T_{HW/1h}$ of 141° C., di-tert.-butyl peroxide (TBP) with $T_{HW/1h}$ of 141° C., cumine-hydroperoxide (CHP) with $T_{HW/1h}$ of 166° C. and tert.-butyl-hydroperoxide (TBHP) with $T_{HW/1h}$ of 185° C.

A preferred implementation form of the procedure for the manufacture of carboxylated ethylene polymers or ethylene copolymer blends consist in that in the $1^{st}$ step to 100 pbw particulate ethylene polymer with MFR (190° C./2.16 kg) of 20-1000 g/10 min, chosen from among an ethylene homopolymer (HDPE-$NM_w$, LDPE-$NM_w$) and/or a linear ethylene copolymer of composition≥90-98 wt.-% ethylene/2 to ≤10 wt.-% $C_{3-8}$-olefin units (LLDPE*-$NM_w$), are gradtpolymerized 0.2-12 pbw MSA, alone or as monomer mixture with 0.02-6 pbw styrene, with addition of 0.05-5 pbw of a mixture consisting of at least two radical-forming initiators with different 1 h half time temperatures ($T_{HW/1h}$) of 50-120° C. and of 120-180° C. in the mixture, at reaction temperatures of 50-100° C., over a reaction time of 8-80 min, and subsequently, in the $2^{nd}$ step, reacting a mixture of 100 pbw of the modified ethylene (co)polymer obtained in the $1^{st}$ solid phase step, 180-3600 pbw of an unmodified ethylene polymer or polymer blend with an MFR (190° C., 2.16 kg) of 0.1-20 g/10 min, chosen from among ethylene homopolymers (HDPE-$HM_w$, LDPE-$HM_w$) or ethylene copolymers of composition≥90-98 wt.-% ethylene/2-≤10 wt.-% $C_{3-8}$ olefin units (LLDPE*-$HM_w$) or HDPE/LLDPE blends-$HM_w$, and 100-3000 pbw of an elastomer (ELPP, PER) consisting of 50-75 wt.-% ethylene and 25-50 wt.-% $C_{3-8}$-olefin units (EOR), or of 70-100 wt.-% propylene and 0-30 wt.-% ethylene units, that contains at least one known stabilization agent and/or antioxidant, and continuously feeding it into an extruder, at mass temperatures of 170-250° C., where the graft-modified olefin polymer blend with a degree of carboxylation of 0.1-0.6 wt.-% is continuously removed at the extruder jet.

Corresponding to this preferred procedural variant, together with the olefinic elastomer the total amount of stabilization agent/antioxidant necessary for the entire carboxylated ethylene polymer blend is added, into which it had been dispersed using a separate mixing technology.

The stabilization agents and/or antioxidants that can be used are the substances known for olefinic polymers and elastomers, in particular primary antioxidants based on sterically hindered phenolic compounds, in amounts of 0.01-5 pbw, preferably of 0.1-2 pbw, relative to 100 pbw olefin elastomer. It is also possible to use combinations of in each case at least one primary and one secondary antioxidant, for instance systems of one sterically hindered phenolic and one phosphite compound.

Preferably the graft-modified ethylene polymer blends with a degree of carboxylation of 0.05-1 wt.-%, preferably of 0.1-0.6 wt.-%, are used as adhesion promoters and/or as adhesives for different substrates, preferably on and between metal surfaces.

The procedure according to the invention is elucidated below by means of Examples, without being limited to them.

$1^{st}$ Step (Solid Phase Grafting Step)

EXAMPLE 1

In a fluids mixing reactor of the Reimelt Henschel company that can be temperature-controlled, equipped with a continuously regulable stirrer, are preplaced 96.6 pbw of a LLDPE powder of density 0.920 g/cm³, a MFR (190° C., 2.16 kg) of 47 g/10 min and a mean particle diameter $d_r$ of 0.21 mm (LLDPE-1), together with 0.16 pbw dicetylperoxy-dicarbonate (DCPOC), 0.47 pbw 2,5-dimethyl-2,5-di-(tert.-butylperoxy)-hexane (DHBP) and 2.69 pbw MSA at an inner reactor temperature of 20° C. Next, in a $N_2$ atmosphere, at a stirring speed of 400/min, with simultaneous temperature increase at a heating rate of 1.2° C./min, the reaction mixture is dispersed and once the end reaction temperature $T_{R1}$ of 70° C. is attained, it is maintained for a time $t_{R1}$ of 60 min at that temperature.

The solid phase reaction is ended by discharging the reaction product into a cooling mixer at 20° C., from which it will be later removed for the $2^{nd}$ melt-graft step (Example 13).

EXAMPLES 2 THROUGH 12

In accordance with the process management described in Example 1, other graft-modified ethylene (co)polymers are manufactured in the solid phase, using the following ethylene polymer graft substrate powders LLDPE-1: density 0.920 g/cm³, MFR (190° C., 2.16 kg)=47 g/10 min
LLDPE-2: density 0.915 g/cm³, MFR (190° C., 2.16 kg)=25 g/10 min
HDPE-1: density 0.958 g/cm³, MFR (190° C., 2.16 kg)=38 g/10 min
Ethylene/octene copolymer with a $C_8$ fraction of 16 wt.-% (EOP*): density 0.913 g/cm³, MFR (190° C., 2.16 kg)=30 g/10 min by adding MSA or AS, or an MSA/styrene(S) or AS/S mixture, as well as a combination of two peroxidic initiators. The initiators used were DHBP, DCPOC and DLPO.

Retaining the charging and heating rates used in Example 1, the essential parameters varied were the reaction end temperature $T_{R1}$ and the reaction times $t_{R1}$ relevant for $T_{R1}$, as well as the monomer/initiator ratio corresponding to the Examples listed in Table 1.

Table 1 contains the process parameters important for the $1^{st}$ step:
Example No. (first column)
ethylene polymer used (graft substrate), in wt.-%) (column 2)
type and concentration of initiators used, wt.-% (column 3)
MSA or AS, indicating the concentration, wt.-% (column 4)
styrene (S), indicating the concentration, wt.-% (column 5)
reaction times ($t_{R1}$), in min (column 6)
reaction end temperatures ($T_{R1}$), in ° C. (column 7)

$2^{nd}$ Step (Melt-Graft Step)

EXAMPLES 13-27

The solid phase product powder in Example 1, obtained in the $1^{st}$ step is fed by means of a dosing balance at a feed rate of 1.16 pbw per hr (MT/h) into a twin-screw kneading extruder type ZSK 25 (L=42 D; temperatures in the range of 175-250° C.; screw rate: 300 rpm) of the Werner % Pfleiderer company, equipped with underwater granulation (UWG). At the same time, over different balances, are dosed 5.84 MT/h LLDPE-3 granulate (density 0.917 g/cm³; MFR (190/2.16)= 2.3 g/10 min) and 3.0 MT/h granular propylene/ethylene (20 wt.-%) elastomer with a volume melt-flow rate MVR (190/2.16)=1.2 cm³/10 min) (PER*) to which 0.88 wt.-% Irganox 1330 (Ciba) had been previously added.

The reactive extrusion takes place in correspondence with the mass ratios indicated above between the solid phase graft product LLDPE-3 granulate and PER* at a mean throughput of 10 MT/h.

The product strand leaving the extruder jet at a temperature $T_M$ of 207° C. is processed by UWG. After drying the granulate, the following characteristic values are determined (Example 13):

MFR (190° C./5 kg)=2.7 g/10 min and

Degree of maleinization $CS_{ex}$=0.25 wt.-%

TABLE 1

| Bspl.-Nr. | Olefinpolymer [Ma.-%] | Initiator [Ma.-%] | Carboxyl-monomer [Ma.-%] | Co-monomer [Ma.-%] | $t_{R1}$ [min] | $T_{R1}$ [° C.] |
|---|---|---|---|---|---|---|
| 1 | 96.6 LLDPE-1 | 0.16 DCPOC 0.47 DHBP | 2.69 MSA | — | 60 | 70 |
| 2 | 96.64 LLDPE-2 | 0.20 DLPO 0.47 DHBP | 2.69 MSA | — | 60 | 85 |
| 3 | 96.7 LLDPE-2 | 0.12 DCPOC 0.47 DHBP | 2.69 MSA | — | 55 | 70 |
| 4 | 96.68 HDPE-1 | 0.16 DLPO 0.47 DHBP | 2.69 MSA | — | 55 | 85 |
| 5 | 95.3 HDPE-1 | 0.12 DCPOC 0.47 DHBP | 2.69 MSA | 1.35 S | 60 | 68 |
| 6 | 95.3 LLDPE-1 | 0.17 DLPO 0.47 DHBP | 2.69 MSA | 1.35 S | 50 | 90 |
| 7 | 88.5 LLDPE-2 | 0.22 DLPO 1.65 DHBP | 9.6 MSA | — | 65 | 85 |
| 8 | 88.55 HDPE-1 | 0.20 DCPOC 1.65 DHBP | 9.6 MSA | — | 60 | 70 |
| 9 | 92.1 LLDPE-1 | 0.18 DCPOC 0.82 DHBP | 5.4 AS | 1.5 S | 50 | 75 |
| 10 | 93.5 LLDPE-1 | 0.18 DCPOC 0.92 DHBP | 5.4 MSA | — | 60 | 70 |
| 11 | 96.64 EOP* | 0.20 DLPO 0.47 DHBP | 2.69 MSA | — | 60 | 85 |
| 12 | 94.4 EOP* | 0.15 DCPOC 0.65 DHBP | 3.6 AS | 1.2 S | 60 | 70 |

[KEY: Bspl.-Nr. = Example No. Ma-% = wt.-%]

Besides the ethylene polymers graft-modified in the 1st step, the following ethylene polymer graft substrates were used in the 2nd graft step:

LLDPE-3, density 0.917 g/cm³ and MFR (190/2.16)=2.3 g/10 min

LLDPE-4, density 0.922 g/cm³ and MFR (190/2.16)=4.9 g/10 min

HDPE-2, density 0.962 g/cm³ and MFR (190/2.16)=0.5 g/10 min

PE blend (reactor blend of composition 40 wt.-% LLDPE and 60 w.-% HDPE), MFR (190/2.16)=0.8 g/10 min as well as the following olefin elastomers (in each case containing 0.88 wt.-% Irganox 1330:

PER*, density 0.855 g/cm³ and MVR (190/2.16)=1.2 g/10 min

EOR*-1, density 0.868 g/cm³ and MFR (190/2.16)=0.5 g/10 min

EOR*-2, density 0.870 g/cm³ and MFR (190/2.16)=5 g/10 min

Column 6: mean mass temperature ($T_M$) measured at the ZSK jet, in ° C.

Column 7: Melt flow rate MFR (190° C., 5 kg) in g/10 min

Column 8: Grafted carboxylic acid content ($CS_{ex}$), in wt.-%

Adhesion or peel strength, in N/mm

The grafted MSA or AS content $CS_{ex}$, i.e. the degree of grafting (also called degree of carboxylation, or in MSA grafting, degree of maleinization) is determined by back-titration of the KOH not neutralized by the fraction of carboxylic acid (MSA or AS), as follows:

After treating for 6 h at 80° C. the residue obtained in boiling methanol of a 2 g graft product sample with a mixture of 100 mL water-saturated xylene and 20 mL 0.1 M methanolic KOH—after addition of a few drops of a 1% methanolic phenolphthalein solution—titration with 0.1 M HCl.

The melt flow rates MFR (190° C./5 kg load weight) were determined according to ISO 1133.

TABLE 2

| | Extruder-Fahrweise | | | | Kennwerte | |
|---|---|---|---|---|---|---|
| Bspl. Nr. | Festphasen-produkt-Tab. 1 [MT/h] | PE-HM$_w$ [MT/h] | Olefin-elastomer [MT/h] | $T_M$ [° C.] | MFR (190/5) [g/10³] | $CS_{ex}$ [Ma.-%] | Schäl-festigkeit [N/mm] |
| 13 | 1.16 Nr. 1 | 5.84 LLDPE-3 | 3.0 PER* | 207 | 2.7 | 0.25 | 7.2 |
| Vgl. 13A | — | 6.94 LLDPE-3 + 0.05 MSA + 0.01 DHBP | 3.0 PER* | 207 | 0.2 | 0.20 | 3.1 |
| 14 | 1.16 Nr. 2 | 5.84 LLDPE-4 | 3.0 EOR*-1 | 215 | 5.5 | 0.26 | 7.0 |
| 15 | 1.4 Nr. 3 | 7.0 HDPE-2 | 3.6 EOR*-2 | 215 | 2.6 | 0.27 | 6.8 |
| Vgl. 15A | — | 8.33 HDPE-2 + 0.06 MSA + 0.01 DHBP | 3.6 EOR*-2 | 216 | nicht meßbar (fließt nicht) | 0.22 | 3.0 |
| 16 | 1.16 Nr. 4 | 5.84 PE-Blend | 3.0 PER* | 219 | 4.7 | 0.24 | 7.8 |
| 17 | 2.5 Nr. 4 | 7.5 LLDPE-4 | 3.0 EOR*-2 | 212 | 4.1 | 0.27 | 6.4 |
| 18 | 2.5 Nr. 4 | 4.5 PE-Blend | 3.0 PER* | 210 | 6.7 | 0.23 | 7.9 |
| Vgl. 18A | — | 6.94 PE-Blend + 0.05 MSA + 0.012 DHBP | 3.0 PER* | 212 | nicht meßbar (fließt nicht) | 0.18 | 4.1 |
| 19 | 1.16 Nr. 5 | 5.84 HDPE-2 | 3.0 PER* | 224 | 1.0 | 0.27 | 6.2 |
| 20 | 1.4 Nr. 6 | 7.0 LLDPE-4 | 3.6 PER* | 212 | 5.6 | 0.23 | 6.0 |
| 21 | 0.3 Nr. 7 | 6.7 LLDPE-3 | 3.0 EOR*-1 | 210 | 2.5 | 0.21 | 4.6 |
| 22 | 0.36 Nr. 8 | 8.04 PE-Blend | 3.6 EOR*-1 | 212 | 1.6 | 0.23 | 4.8 |
| Vgl. 22A | — | 6.94 PE-Blend + 0.05 MSA + 0.01 DHBP | 3.0 EOR*-1 | 212 | nicht meßbar (fließt nicht) | 0.17 | 3.1 |
| 23 | 0.8 Nr. 8 | 6.7 PE-Blend | 2.5 EOR*-2 | 220 | 2.1 | 0.61 | 6.1 |
| 24 | 1.74 Nr. 9 | 8.76 HDPE-2 | 4.5 PER* | 210 | 1.5 | 0.37 | 3.5 |
| 25 | 1.16 Nr. 10 | 5.84 LLDPE-4 | 3.0 EOR*-1 | 209 | 2.8 | 0.49 | 6.2 |
| 26 | 2.5 Nr. 11 | 7.5 LLDPE-3 | 3.0 EOR*-2 | 207 | 2.2 | 0.23 | 5.4 |
| 27 | 1.16 Nr. 12 | 5.84 PE-Blend | 3.0 PER* | 210 | 3.6 | 0.33 | 3.8 |

[KEY: Bspl. = Example Fahrwise = operating mode Kennwerte = characteristic values Festphasenprodukt = solid phase product Schälfestigkeit = peel strength Nr. = No. Vgl. = cf. nicht messbar (fliesst nicht)t = not measurable (does not flow)]

Table 2 lists:
Column 1: Example number
Column 2: Concentration of solid phase graft product used, indicating the
Column 3: corresponding Example No./Table 1 in pbw/h (MT/h)
Type and concentration of the LLDPE-HM$_w$, HDPE-HM$_w$ or
Column 4: LLDPE/HDPE blend HM$_w$ (PE-HM$_w$) used, in MT/h
Column 5: Type and concentration of olefin elastomer used, in MT/h Table 2 above lists the melt-graft parameters and the MFR and $CS_{ex}$ values obtained for the carboxylated ethylene (co) polymer systems obtained from the components listed above.

In addition Table 2 lists a characteristic value for the adhesion strength (modified peel strength) as the essential property for the evaluation of the carboxylated ethylene copolymer blends according to the invention.

For comparison, Table 2—without preplacing one of the ethylene (co)polymers grafted in the solid phase—four ethylene (co)polymers graft-carboxylated only in the melt (Examples Vgl. 13A, Vgl. 15A, Vgl. 18A and Vgl. 22A), where in contradistinction to the examples according to the invention, instead of the graft product manufactured in the 1st step, the MSA and the initiator DHBP, admixed into a part of the PE-HM$_w$ used in each case is dosed in. Accordingly, following Example Vgl. 13A, over the first balance a mixture of 1.10 MT/h LLDPE-3, 0.05 MT/h MSA and 0.01 MT/h DHBP are dosed and over a second balance, 5.84 MT/h pure LLDPE-3. The procedure was repeated correspondingly for the other three comparison examples.

The adhesion strength characteristic value used is the peeling strength determined in a material testing machine TC-FR010TH.A5V of Zwick GmbH & Co. on a clamped specimen of sheet aluminum strip/0.3 mm adhesion promoter sheet/sheet aluminum strip composite (Al/HV/Al) at a drawing speed of 100 mm/min.

After drying, the granulates obtained by UWG are extruded to 0.3 mm thick sheets cut into strips 80 mm long and 40 mm wide, placed between two Al strips of the same dimensions. Next the Al/HV/Al composites are annealed in a hot cabinet at 180° C. and after differently long storage times in the hot cabinet, are measured without applying additional weight or pressure.

After a storage time of 8 min, the measurement is performed on the Al/HV/Al strips cut into three (13.3×80) mm. The peel strengths listed in Table 2 are average values obtained in each case from four Al/HV/Al composites (and thus from 12 individual test strips) for a tested adhesive.

As the comparison between the graft product characteristic values and those of the pure melt-carboxylation products (Examples Vgl. 13A, 15A, 18A and 22A) shows, the carboxylated ethylene polymer blends manufactured according to the invention are characterized by high adhesion strengths (peel strengths) with simultaneously melt viscosities well suited for use, corresponding to MFR (190° C./5 kg) values of 1-7 g/10 min.

It addition it should be especially pointed out that the high peel strengths of these new adhesion promoters remain unchanged even after long annealing. This result, based on the two-step solid phase/melt-graft carboxylation, could not have been expected.

The invention claimed is:

1. Procedure for the manufacture of carboxylated ethylene polymer blends, characterized by in a 1$^{st}$ step, in a fluid mixing reactor, adding 0.05-15 parts by weight (pbw) of an α,β-ethylenically unsaturated mono and/or dicarboxylic acid or its anhydride (carboxyl monomer), or a monomer mixture containing at least one carboxyl monomer and 0.01-10 pbw of a free radical-forming initiator with a 1 h half-time temperature (T$_{HW/1h}$) of 50-200° C., and graft-polymerizing at reaction temperatures of 30-120° C. for 5-120 min, to 100 pbw of solid-fluid particulate ethylene polymer with an MFR (190° C./2.16 kg load weight)≥20 g/10 min, chosen from among ethylene homopolymers and/or linear ethylene copolymers of composition≥80-98 wt.-% ethylene/2 to ≤20 wt.-% C$_{3-12}$-olefin units and subsequently, in a 2$^1$ step, continuously feeding into a reaction extruder via gravimetric dosing devices:
 a) 100 pbw of the modified ethylene polymer obtained in the 1$^{st}$, solid phase step—together with
 b) 150-4,000 pbw of an unmodified ethylene polymer or polymer blend with a MFR (190° C./2.16 kg load weight) of <20 g/10 min, chosen from among ethylene homopolymers or ethylene copolymers of composition≥85-98 wt.-% ethylene/2 to ≤15 wt.-% C$_{3-12}$-olefin units, or compounds or reactor blends consisting of LLDPE and HDPE, together with
 c) 0-4,000 pbw of i) an olefinic elastomer having 10-100 wt.-% of units derived from propylene and 0-90 wt.-% of units derived from a monomer selected from the group consisting of ethylene or C$_{4-12}$-olefin or diene units and mixtures thereof, or ii) an ethylene copolymer containing 10-80 wt.-% of comonomer units derived from vinyl acetate (EVA) or (meth)acrylic acid ester (E(M)AE) and mixtures thereof;
and reacting the above components at temperatures of 160-260° C. such that at a reactor end, a graft-modified olefin polymer blend with a carboxylation degree of 0.05 to 1 wt.-% is continuously discharged.

2. Procedure for the manufacture of carboxylated ethylene polymer blends according to claim 1, characterized by using maleic acid anhydride and/or acrylic acid or their mixtures as carboxyl monomer, with a comonomer from the group of vinyl aromatics and/or the C$_{1-12}$-alkyl esters of acrylic or methacrylic acid, of composition 99-20 wt.-% carboxyl monomer/1-80 wt.-% comonomer, in the solid phase step.

3. Procedure according to claim 2, characterized by graft polymerizing in the 1$^{st}$ step, for 100 pbw particulate ethylene polymer—with MFR (190° C./2.16 kg) of 20-1000 g/10 min, chosen from an ethylene homo-polymer and/or a linear ethylene copolymer of composition≥90-98 wt.-% ethylene/2 to ≤10 wt.-% C$_{3-8}$-olefin units—0.2-12 pbw MSA, alone or as monomer mixture with 0.02-6 pbw styrene, under addition of 0.05-5 pbw of a mixture consisting of at least two radical-forming initiators with different half-time temperatures (T$_{HW/1h}$) of 50-120° C. and of 120-180° C., at reaction temperatures of 50-100° C., for a reaction time of 8-80 min and subsequently, in a 2$^{nd}$ step, continuously feeding into an extruder a mixture of (a) 100 pbw of the modified ethylene (co)polymer obtained in the 1$^{st}$ step, (b) 180-3600 pbw of an unmodified ethylene polymer or polymer blend with an MFR (190° C./2.16 kg) of 0.1-20 g/10 min, chosen from among ethylene homopolymers or ethylene copolymers of composition≥90-98 wt.-% ethylene/2 to ≤10 wt.-% C$_{3-8}$-olefin units or HDPE/LLDPE-blends, and (c) 100-3,000 pbw of an elastomer consisting of 50-75 wt.-% ethylene and 25-50 wt.-% C$_{3-8}$-olefin units or of 70-100 wt.-% propylene and 0-30 wt.-% ethylene and/or C$_{4-8}$-olefin units that contains at least one stabilization agent and/or antioxidant, reacting at mass temperatures of 170-250° C. and continuously taking from the extruder a graft-modified olefin polymer blend with a degree of carboxylation of 0.1-0.6 wt.-%.

4. Procedure according to claim 3, characterized by the olefinic elastomer being present and wherein the olefinic elastomer is further characterized by containing a primary antioxidant added in a separate mixing step or a combination of in each case at least one primary and one secondary antioxidant, in an amount of 0.01-5 pbw relative to 100 pbw olefin elastomer.

5. The procedure of claim 2 wherein the vinyl aromatic comonomer is styrene.

6. The procedure of claim 2 wherein the C$_{1-12}$-alkyl esters of acrylic or methacrylic acid is methyl methacrylate or methyl acrylate or ethyl acrylate or butyl acrylate.

7. The procedure of claim 4 wherein the primary antioxidant is a sterically hindered phenol.

8. The procedure of claim 4 wherein the combination of at least one primary antioxidant and at least one secondary antioxidant is a system containing a sterically hindered phenolic compound and a phosphite compound.

* * * * *